US006990110B2

(12) United States Patent
Nattkemper et al.

(10) Patent No.: US 6,990,110 B2
(45) Date of Patent: Jan. 24, 2006

(54) AUTOMATIC PERMANENT VIRTUAL CIRCUIT CONNECTION ACTIVATION FOR CONNECTION ORIENTED NETWORKS (75) Inventors: Dieter H. Nattkemper, Raleigh, NC (US); Robert S. Kroninger, Wake Forest, NC (US); Melvin R. Phillips, Raleigh, NC (US)

(73) Assignee: ADC DSL Systems, Inc., Eden Prairie, MN (US)

( * ) Notice: Subject to any disclaimer, the term of this patent is extended or adjusted under 35 U.S.C. 154(b) by 530 days.

(21) Appl. No.: 09/833,780

(22) Filed: Apr. 12, 2001

(65) Prior Publication Data
US 2002/0150108 A1 Oct. 17, 2002

(51) Int. Cl.
*H04L 12/56* (2006.01)

(52) U.S. Cl. ...................................... 370/397; 370/409

(58) Field of Classification Search ................ 370/254, 370/389, 395.1, 396, 397, 398, 399, 395.2, 370/395.3, 401, 409, 437
See application file for complete search history.

(56) References Cited

U.S. PATENT DOCUMENTS

| 6,009,106 | A | | 12/1999 | Rustad et al. |
| 6,041,057 | A | * | 3/2000 | Stone ........................ 370/397 |
| 6,052,374 | A | | 4/2000 | Stephens |
| 6,160,810 | A | | 12/2000 | Brodigan |
| 6,198,745 | B1 | * | 3/2001 | Brodigan ............... 370/395.51 |
| 6,349,098 | B1 | * | 2/2002 | Parruck et al. .......... 370/395.6 |
| 6,388,990 | B1 | | 5/2002 | Wetzel |
| 6,560,225 | B1 | | 5/2003 | Czajkowski et al. |
| 6,574,313 | B1 | | 6/2003 | Chea, Jr. et al. |
| 6,580,254 | B2 | | 6/2003 | Schofield |
| 2001/0015978 | A1 | * | 8/2001 | Blanset et al. .............. 370/395 |
| 2002/0071440 | A1 | * | 6/2002 | Cerami et al. .............. 370/404 |

FOREIGN PATENT DOCUMENTS

| WO | WO 01/26313 A1 | 4/2001 |
| WO | WO 01/73987 A2 | 10/2001 |
| WO | WO 02/091791 A1 | 11/2002 |

OTHER PUBLICATIONS

Pickering, A. "Wireline Access Evolution". IEEE. Jan. 26, 2000, pp. 2/1-2/3.*
Black, Ulyless. "ATM Foundation for Broadband Networks". Prentice Hall. Copyright 1995. pp. 241-255.*
Rice, Liz. "Soft PVCS in an ATM Network". Data Connection Limited. Jan. 23, 2001. pp. 1-9.*
Gagnaire, Maurice. "An Overview of Broad-band Access Technology". IEEE. Dec. 1997. pp. 1958-1972.*

(Continued)

Primary Examiner—Ricky Ngo
Assistant Examiner—Derrick W Ferris
(74) Attorney, Agent, or Firm—Fogg and Associates, LLC; Laura A. Ryan (57) ABSTRACT A method of automatic permanent virtual circuit connection activation is provided. The method includes detects initiation of communication between a first and a second network element at a first reference point. The method further receives at least one virtual circuit identifier of the first network element and learning at least one virtual circuit identifier of the second network element. In addition, the method creates a translation connection between the first and second network elements.

42 Claims, 4 Drawing Sheets

OTHER PUBLICATIONS

Pickering, A. "Wireline Access Evolution". IEEE. Jan. 26, 2000. pp. 2/1-2/3.*

"Light Link Direct CPON1315, Customer Premises Optical Node", Pacific Broadband Networks, Feb. 13 2001, 3 pgs.

"Channelized Voice over DSL (CVoDSL) Residential Voice over DSL Technology for Multi-Service Access Platform (MSAP) Equipment", Technology Whitepaper, May 14, 2001, 15 pgs.

* cited by examiner

AUTOMATIC PERMANENT VIRTUAL CIRCUIT CONNECTION ACTIVATION FOR CONNECTION ORIENTED NETWORKS

TECHNICAL FIELD

The present invention relates generally to the field of data communications or telecommunications and, in particular, to the automatic connection activation of permanent virtual circuits in communication networks.

BACKGROUND

The asymmetric digital subscriber loop (ADSL) services that are being deployed throughout the world provide a "user to network interface." (UNI) Conventionally, an ADSL modem is connected to a digital service line access multiplexer (DSLAM) via the UNI. The ADSL service is invoked by provisioning at least one virtual circuit. The virtual circuit needs to be provisioned from end-to-end (source to destination) and involves multiple network elements. The provisioning procedure is tedious and time consuming. Some modems and DSLAMs are configured to default to a single virtual circuit for each end user. In order for the ADSL service to be functional, both the ADSL modem and an associated DSLAM need to have a compatible ATM layer configuration. Existing networks that utilize virtual circuit connections and can be categorized as connection oriented, include but are not limited to "asynchronous transfer mode (ATM), frame relay (FR) and multi-protocol label switching (MPLS).

The common network element deployment strategies typically consist of manually provisioning a permanent virtual circuit (PVC), default initializing a PVC, or implementing a signaling connection setup sequence for switched virtual circuits (SVC). The signaling connection setup sequence requires pre-provisioned signaling client/server entities in some of the elements. A combination of the above strategies may also be applied to the access network. The above described deployment strategies are labor intensive and can cause interoperability limitations between different vendor's equipment.

For the reasons stated above, and for other reasons stated below which will become apparent to those skilled in the art upon reading and understanding the present specification, there is a need in the art for improvements in end-to-end provisioning of communication systems.

SUMMARY

The above-mentioned problems with end-to-end provisioning in communication systems and other problems are addressed by embodiments of the present invention and will be understood by reading and studying the following description.

A method of automatic permanent virtual circuit connection activation is provided. The method includes detecting initiation of communication between a first and a second network element at a first reference point. The method further includes receiving at least one virtual circuit identifier of the first network element and learning at least one virtual circuit identifier of the second network element. In addition the method includes creating a translation connection between the first and second network elements.

Another method of automatic permanent virtual circuit connection activation is provided. The method detects initiation of communication between a first and a second network element at a first reference point. The method learns at least one virtual circuit identifier of the first network element and learns at least one virtual circuit identifier of the second network element. Further the method creates a translation connection between the first and second network elements.

A communication network has been described. The communication network includes an access network, a central unit selectively coupled to the access network and a customer premises equipment selectively coupled to the central unit. In addition, the communication network includes an automatic permanent virtual circuit (PVC) connection activation function embedded within the central unit. The automatic PVC is enabled when the customer premises equipment is initialized and is adapted to create a translation connection between the customer premises equipment and the central unit.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

The invention described herein applies to virtual circuit connections for connection-oriented networks including but not limited to "asynchronous transfer mode (ATM), frame relay (FR) and multi-protocol label switching (MPLS). Networks of this type utilize virtual circuit connections that have local significance on a communications link. An "end to end" virtual connection is created by the network elements that translate the virtual circuit connection identifier (VCCI) values to the required value for the next link.

The naming convention for the "virtual circuit connection" varies for each network protocol. The definition of the "virtual circuit connection" herein is a communications method on any communications link that supports a connection oriented address structure which permits multiplexing more than one communication session onto one physical link. In addition, the "virtual circuit connection" does not consume communication link bandwidth when the given communications session is idle. When it is necessary to reference the address field of any given network protocol that supports "virtual circuit connections" then the term "virtual circuit identifier" is utilized.

Embodiments of the present invention implement a method for automatic permanent virtual circuit (PVC) connection activation between an access network and customer premises equipment. The method provides end-to-end connection between the customer premises and an access network. In one embodiment, the method learns both the virtual circuit identifier values of the associated customer premises equipment and a network element. The encoding of the virtual circuit identifiers is dependent on the given connection oriented protocol. In another embodiment, the method learns the virtual circuit identifier values of the associated customer premises equipment and is provided the virtual circuit identifier values of the network element. Once the virtual circuit identifier values of the associated equipment are known, the method provisions its associated switching function for the known values and provides an automatic translation between the customer premises equipment and the network element.

In one embodiment, the present invention provides a method of automatic PVC connection activation that enables a 'plug and play' solution for an asymmetric digital subscriber loop (ADSL) access network. An "automatic PVC algorithm" permits the network equipment to automatically learn about the end user device ADSL modem equipment configuration and automatically establish an ATM layer connection.

Figure 1:
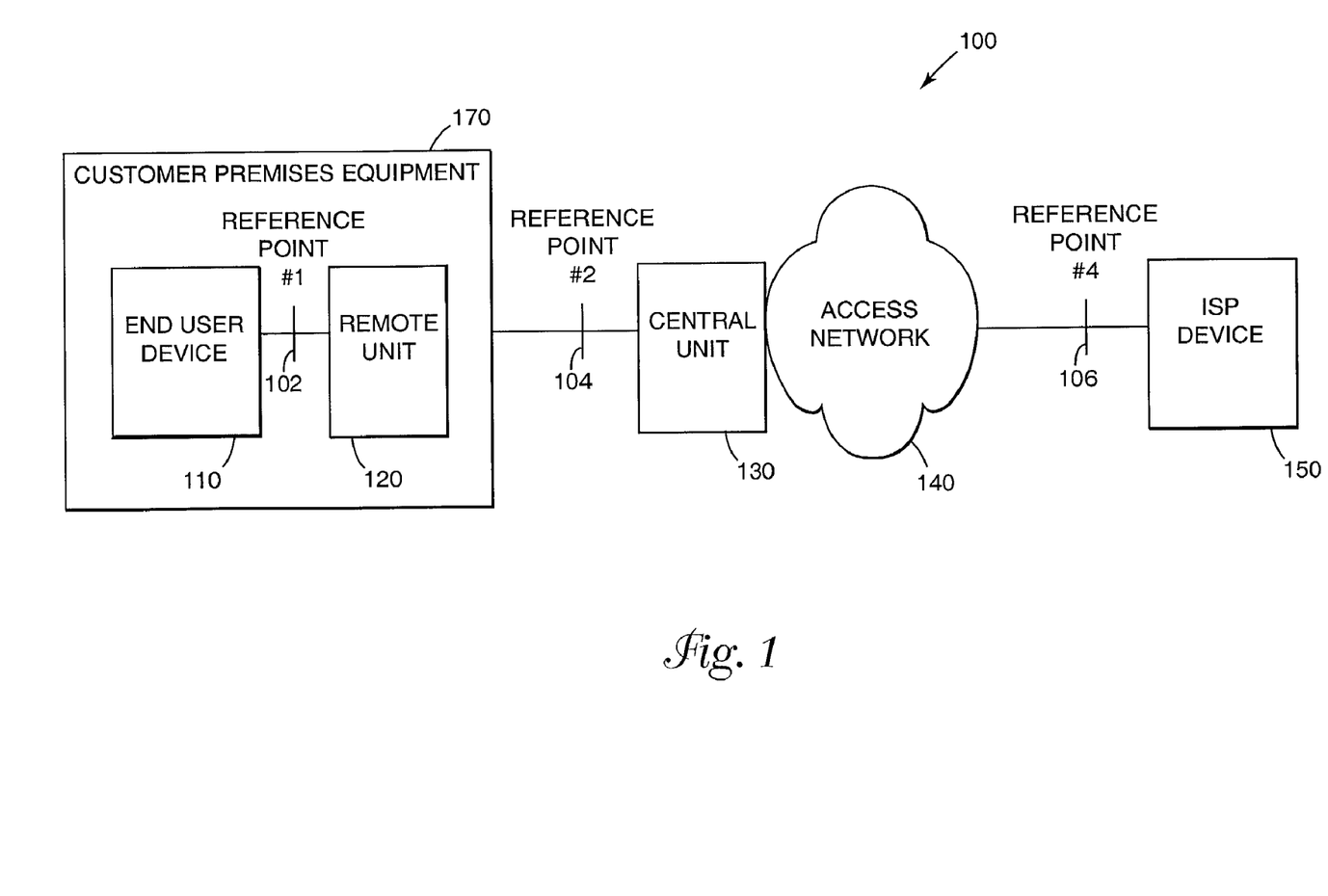
FIG. 1 is a block diagram of an exemplary communication system employing an embodiment of this invention.

FIG. 1 is a block diagram of one embodiment of a communication system shown generally at 100. Communication system 100 is one example of a system employing automatic PVC connection activation according to the teachings of the present invention. In one embodiment, communication system 100 is a packet, frame, label, cell based communication system, or the like. Communication system 100 includes an end user device 110 selectively coupled to a remote unit 120 via a private interface 102. End user device 110 comprises one or more computers, facsimile machines, data scanners, or the like that interface with remote unit 120 for access to one or more networks such as 140. Private interface 102 is a protocol for communication between end user device 110 and remote unit 120 and is located at reference point #1 that lies between end user device 110 and remote unit 120.

In one embodiment, remote unit 120 is integral to the end user device 110. In another embodiment, remote unit 120 is a separate device that is located at or near the customer's premises. In one embodiment, remote unit 120 is a modem. In another embodiment, remote unit 120 is any interface device that is capable of converting signals for communication between end user device 110 and an access network such as 140. In one embodiment, remote unit 120 and end user device 110 comprise customer premises equipment 170. In one embodiment, a plurality of end user devices such as 110 are coupled to remote unit 120 and remote unit 120 manages transmission priority of the end user devices. In another embodiment, a priority management device such as a router is coupled between a plurality of end user devices such as 110 and remote unit 120.

Remote unit 120 is selectively coupled to central unit 130 via a public interface 104. Public interface 104 is a protocol for communication between the remote unit 120 and central unit 130. Public interface 104 is located at reference point #2 that lies between the customer premises equipment 170 and access network 140. In one embodiment, public interface 104 is a user network interface (UNI). For ease of discussion communication system 100 is described with only one remote unit 120. It is understood that central unit 130 is capable of coupling to a plurality of remote units. Central unit 130 is coupled to access network 140 and provides the cross connection for each virtual connection from one or more customer premises equipment such as 170 and an access network such as 140. In one embodiment, central unit 130 is any one of a number of access network equipment elements such as, an ADSL transmission unit-central office (ATU-C), a central office DSLAM, an integrated DLC, a remote DSLAM that is subtended from a DSLAM or an ATM switch, a remote access multiplexer subtended from a DSLAM or an ATM switch, or the like.

In one embodiment, access network 140 is an ADSL access network. In another embodiment, access network 140 is an xDSL access network or other broadband access network. In one embodiment, access network 140 enables connection to one or more Internet service provider (ISP) devices such as 150. In another embodiment, access network 140 allows connection to other networks such as the internet, wide area networks, public switched telephone network, network elements, network nodes and the like. In one embodiment, ISP device 150 is coupled to access network 140 via a second public interface 106. Public interface 106 is a protocol for interface between ISP device 150 and access network 140. Public interface 106 is located at reference point #4 which lies between access network 140 and ISP device 150. In one embodiment public interface 106 is a network-to-network interface (NNI). In one embodiment, public access network 140 is an ATM network and remote unit 120 and central unit 130 comprise an ADSL transmission unit-remote (ATU-R) and an ADSL transmission unit-central office (ATU-C), respectively.

In operation, communication system 100, when properly configured, communicates data from end-to-end, from the end user device 110 to access network 140 or ISP device 150 or other desired destination, with virtual connection translation between the associated equipment. In one embodiment, virtual connection translation between the associated equipment includes between end user device 110 and remote unit 120, between remote unit 120 and central unit 130 or other network element, between central unit 130 and access network 140, between access network 140 and ISP device 150 or other network element. In one embodiment, ISP device 150 or other network element is the desired destination. In other embodiments, a network reached via ISP device 150 or other network element is the desired destination. It is understood that additional virtual connection translations may be required to reach the desired destination, based on the application.

In one embodiment, data is transmitted between remote unit 120 and central unit 130 using virtual circuit identifier association. When remote unit 120 and central unit 130 are assigned the same virtual circuit identifiers then compatible data transmission is assured. When remote unit 120 and central unit are assigned or programmed to default to different virtual circuit identifiers then virtual connection translation is required. Embodiments of the present invention provide an automatic PVC connection activation between customer premises equipment 170 and central unit 130 or other cross connect equipment associated with access network 140. The other virtual connection translation locations within communication system 100 such as interfaces 102 and 106 are implementation specific and are assumed pre-configured. For example, in one embodiment the network provider manages the virtual connection translation of data at interface 106. As a result, in one embodiment, automatic PVC connection activation enables end-to-end communication regardless of virtual circuit identifiers assigned to remote unit 120. In another embodiment, automatic PVC connection activation enables end-to-end communication regardless of virtual circuit identifiers assigned to remote unit 120 and central unit 130. The flow chart of FIG. 2, described below, provides one method for automatic PVC connection activation. It is understood that although one or more embodiments of the present invention are described with respect to an ATM based network any frame, label switched or packet based network or similar may benefit from automatic PVC connection activation.

Figure 2:
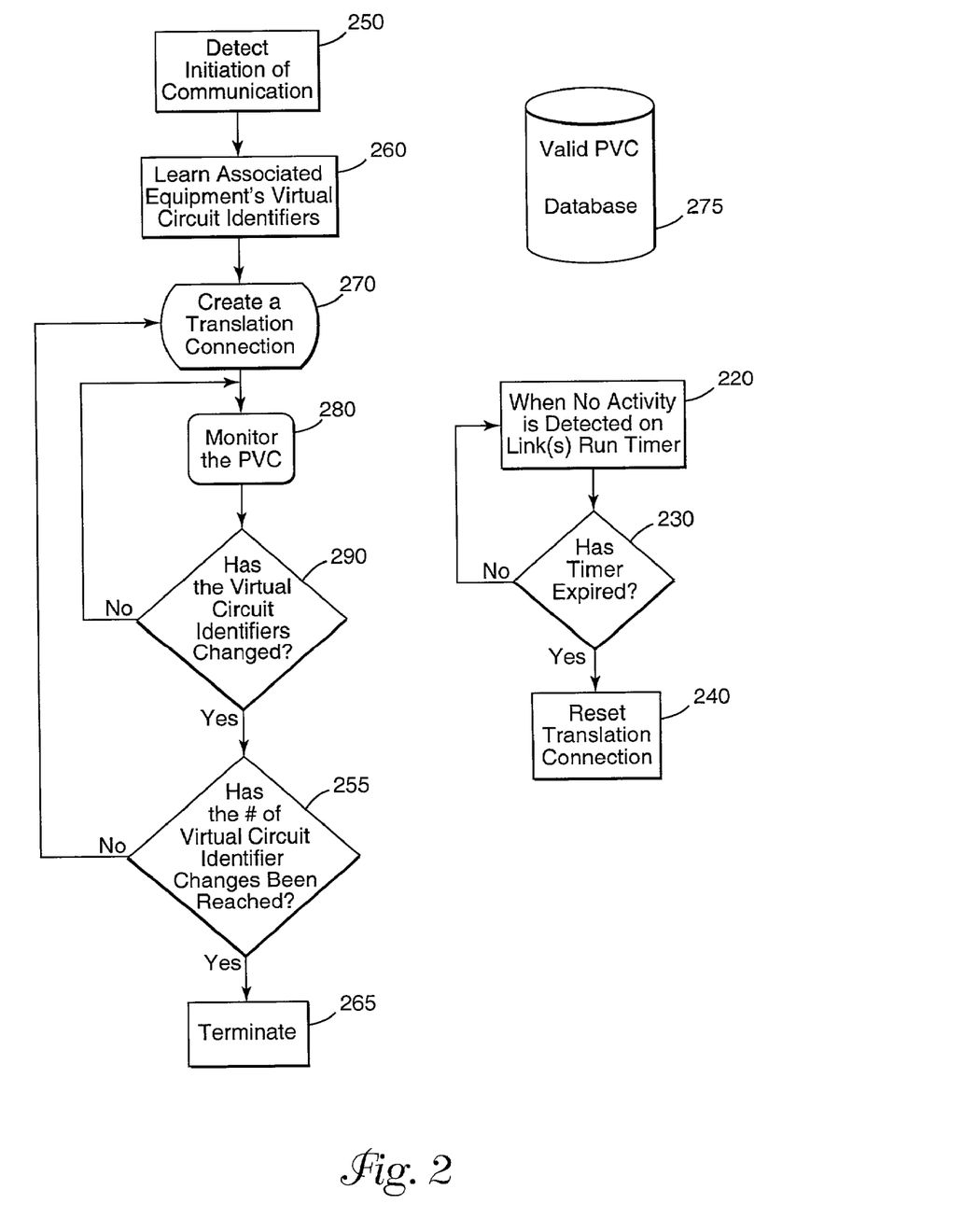
FIG. 2 is a flow chart of one embodiment of a method of automatic permanent virtual circuit (PVC) connection activation according to the teachings of this invention.

FIG. 2 is a flow chart of one embodiment of a method for automatically configuring a permanent virtual circuit connection according to the teachings of the present invention. The method of FIG. 2 begins at block 250 and detects the initiation of communication between two network elements. In one embodiment, the network elements consist of an end user device and a central unit. In one embodiment, the central unit is selectively coupled directly to an access network. In another embodiment, the central unit is selectively coupled indirectly to an access network. Detecting the initiation of communication between two network elements includes monitoring traffic between the two network elements. In one embodiment, detecting the initiation of communication consists of monitoring the arrival of one or more "framed payload structure(s)", such as an ATM cell, high level data link control (HDLC) packet, point-to-point protocol (PPP) protocol data unit (PDU), layer 2 tunneling protocol (L2TP) PDU or other encoding for any connection oriented protocol.

The method then proceeds to block 260 where it learns the virtual circuit identifier value of the associated equipment. For example, in one embodiment, at block 260, the method learns the virtual circuit identifier values of a remote unit associated with the end user device and is provided the virtual circuit identifier values of the central unit. In another embodiment, at block 260, the method learns the virtual circuit identifier values of the remote unit and the central unit. In one embodiment, the method learns the virtual circuit identifier values of the remote unit and/or an associated central unit by monitoring virtual circuit identifier values transmitted from the remote unit and/or the central unit. When a valid PVC value is detected, as defined by "valid PVC data base" at block 275 then the method proceeds to block 270 and creates a translation connection between the remote unit and the central unit. At block 280, the method monitors the permanent virtual circuit connection's "virtual circuit identifier" on one or both links between the remote unit and the central unit and between the central unit and an associated network element or network and then proceeds to block 290.

At block 290, the method determines whether or not the remote unit's virtual circuit identifier value has changed to a new valid PVC value, as defined by "valid PVC data base" at block 275. When the remote unit's virtual circuit identifier value has not changed the method proceeds back to block 280 and resumes monitoring the permanent virtual circuit for any changes. When the remote unit's virtual circuit identifier value has changed to a new valid PVC value, as defined by the "valid PVC data base" at block 275, then the method proceeds to block 255 and determines if a predetermined number of changes of the remote unit's virtual circuit identifier values has been reached. The predetermined number of changes of virtual circuit identifier values at the remote unit acts as a safety mechanism. In normal operation, there are limited cases in which the remote unit's virtual circuit identifier values will need to change. In order to limit changing of virtual circuit identifier values by hackers attempting to stay anonymous the method "times-out" and does not permit the user to proceed after "X" number of value changes that occur over some time period. In one embodiment, the network provider or other network manager sets the value of X. In another embodiment, the network provider or other network manager can also disable operation of the safety mechanism.

When the predetermined number of changes has been reached the method proceeds to step 265 and the method terminates. The termination procedure may include various security policies including disconnecting the current translation connections. When the number of virtual circuit identifier value changes has not been exceeded the method proceeds to block 270 and creates or "recreates" a translation connection based on the new virtual circuit identifier value.

In an alternate embodiment, steps 255 and 265 are omitted and when the method reaches step 280 if the virtual circuit identifier value has changed to a new value as defined by the "valid PVC data base" at block 275 then the method proceeds to step 270 and creates a translation connection based on the new virtual circuit identifier value.

In another embodiment, the method described with respect to FIG. 2 includes a background timer task for disconnecting the translation connection when no activity exists on the two links. In one embodiment, no activity is defined as an idle state when no "framed payload structure" exists between the two network elements. In another embodiment, no activity is defined as an idle state when no "framed payload structure" exists between the two network elements nor between one of the network elements such as a central unit and a third network element or an associated network. In one embodiment, the third network element is a DSLAM, ATM switch, integrated DLC, remote access multiplexer, optical network unit or the like. In one embodiment, when the timer expires the translation connection is disconnected. This background timer task is optional and it is intended to recover from exception events due to errors (or other events) which may result in learning the wrong "virtual circuit identifier" value. The steps associated with the background timer task are described below.

At block 220 a background timer task can either start or continue a timer when no activity exists on both links. The task continues to block 230 and tests for timer expiration and if the timer is not expired the method returns to block 220 to continue. If block 230 detects that the timer has expired then it proceeds to block 240 which will disconnect or reset the translation connection.

In one embodiment, the method described with respect to FIG. 2 operates as an algorithm implemented in hardware or software. In one embodiment, the algorithm implemented in hardware or software is built into the network. In another embodiment, the algorithm is built into the network at the edge of the network. In one embodiment, the algorithm is embedded in a public interface such as 104 as described with respect to FIG. 1. In one embodiment, the method described with respect to FIG. 2 operates as a function. In one embodiment, the function is a centralized function and is launched by a server that provides messaging between the remote unit and the central unit. In one embodiment, the algorithm or function is integral to the operation of the central unit. In another embodiment, the algorithm or function is adjunct to the operation of the central unit. The algorithm or function to implement automatic PVC connection activation is capable of residing in many locations in the network.

Figure 3:
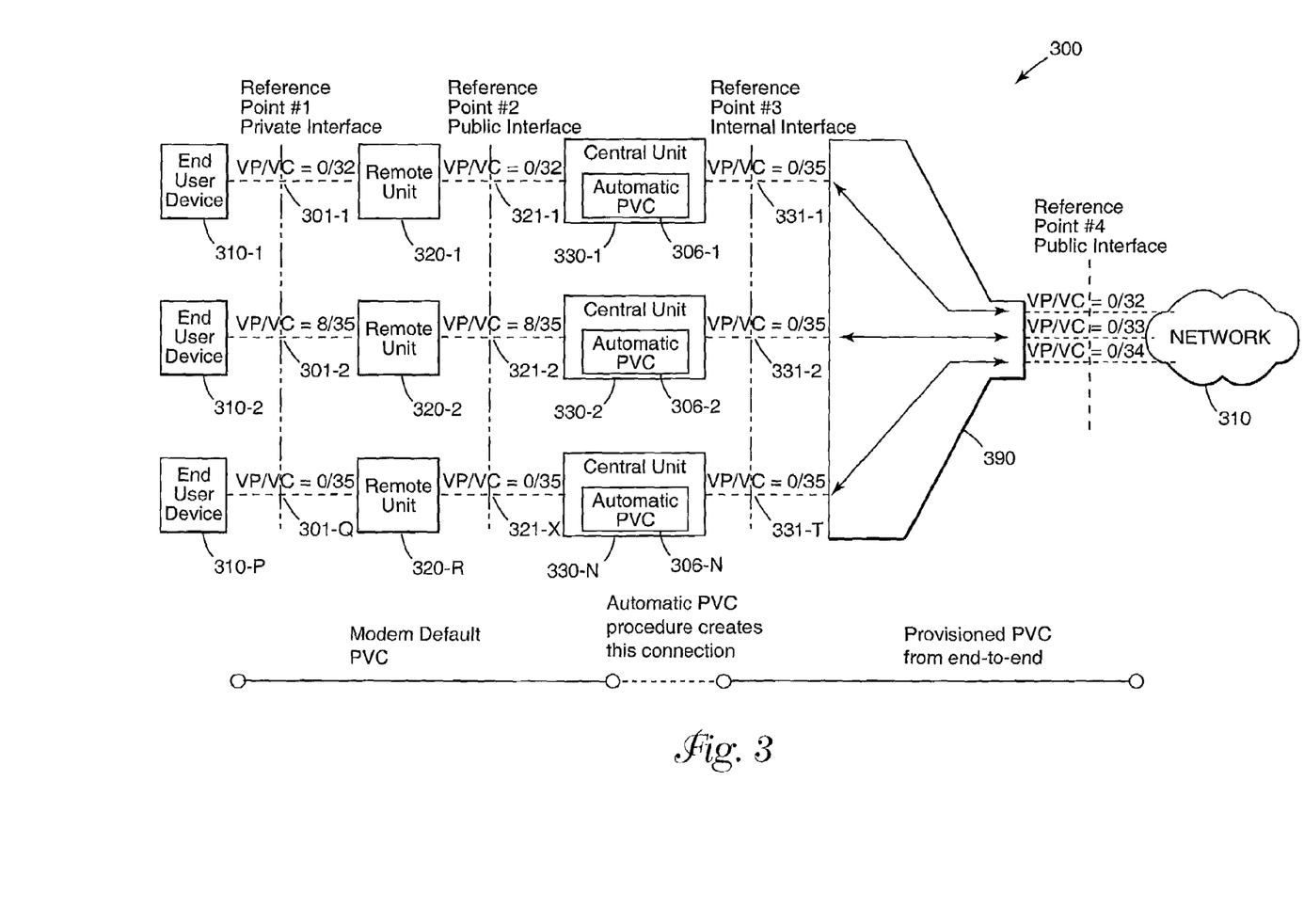
FIG. 3 is an illustration of another exemplary communication system employing an embodiment of this invention.

FIG. 3 is an illustration of one embodiment of a communication system shown generally at 300. Communication system 300 is an example of a system employing automatic PVC connection activation according to the teachings of the present invention. In one embodiment, communication system 300 is a packet, frame, label or cell based communication system. In this embodiment an ATM cell network is described. A permanent virtual circuit associated with each end user device 310-1 to 310-P is connected end-to-end once automatic PVC connection activation is implemented by PVC functions 306-1 to 306-N.

Communication system 300 includes a plurality of remote units 320-1 to 320-R. In one embodiment, each remote unit 320-1 to 320-R is individually assigned a default VP/VC value or has been manually provisioned with VP/VC values. In this embodiment, remote unit 320-1 is assigned VP/VC values 0/32, remote unit 320-2 is assigned VP/VC values 8/35 and remote unit 320-R is assigned VP/VC values 0/35. Private interfaces 301-1 to 301-Q are protocols for communication between end user devices 310-1 to 310-P and remote units 320-1 to 320-R, respectively. Private interfaces 301-1 to 301-Q are located at reference point #1 that lays between each end user device 310-1 to 310-P and its respective remote unit 320-1 to 320-R. The VP/VC values at reference point #1 are shown for completeness their value is arbitrary. Different VP/VC values can exist at reference point #1, if a public network interface is present. If the remote unit 320-1 to 320-R terminates the connection-oriented protocol then reference point one would not exist. In this case the protocol stack on the remote unit 320-1 to 320-R would provide a VP/VC mapping function into the next higher layer of the protocol stack. When referring to a reference point it is understood that the interface is between the associated network elements or a network element and a network.

Remote units 320-1 to 320-R are each selectively coupled to an associated central unit 330-1 to 330-N, via public interfaces 321-1 to 321-X, respectively. Public interfaces 321-1 to 321-X are located at reference point #2 that lies between each remote unit 320-1 to 320-R and its respective central unit 330-1 to 330-N. In one embodiment, public interfaces 321-1 to 321-X are UNIs. Each central unit 330-1 to 330-N is assigned VP/VC values for the reference point #3 side of the central unit. The VP/VC values may be assigned in a number of ways such as by the network provider, network management system, internal default, manual provisioning or the like. In this embodiment, central units 330-1 to 330-N are each assigned VP/VC value 0/35. It is understood that the VP/VC values in this embodiment are arbitrary and are for explanation purposes only. Internal interfaces 331-1 to 331-T are protocols for communication between central units 330-1 to 330-N and network element 390. Internal interfaces 331-1 to 331-T are located at reference point #3 that lies between each central unit 330-1 to 330-N and network element 390.

Central units 330-1 to 330-N are each selectively coupled to a network element 390. In one embodiment, network element 390 is one of a DSLAM, ATM switch, integrated DLC, remote access multiplexer, optical network unit or the like that is either directly or indirectly coupled to network 310. An access network, network provider or the like manages the interface between network element 390 and network 310 at reference point #4.

In one embodiment, when one or more of remote units 320-1 to 320-N are initiating communication via reference point #2 then the automatic PVC connection activation functions 306-1 to 306-N each implements a PVC connection between reference point #2 321-1 to 321-X and its associated reference point #3 331-1 to 331-T, respectively. Each connection is a translation connection created between the VP/VC values at 321-1 to 321-X and the VP/VC values at 331-1 and 331-T, respectively, and enables communication between remote units 320-1 to 320-R and network 310.

The automatic PVC configuration functions 306-1 to 306-N each monitors traffic between their respective remote and central units 320-1 to 320-R and 330-1 to 330-N. Only the operation of automatic PVC connection activation function 306-1 will be described in detailed since automatic PVC connection activation functions 306-2 to 306-N operate identically to 306-1. In one embodiment, when traffic is detected between remote and central units 320-1 and 330-1 automatic PVC function 306-1 learns the VP/VC values of both reference points #2 and #3, 321-1 and 331-1, respectively and creates a translation connection for transmission of traffic between remote unit 320-1 and central unit 330-1. In another embodiment, when traffic is detected between remote and central units 320-1 and 330-1 automatic PVC function 306-1 learns the VP/VC values of reference point #2 321-1 and receives the VP/VC values of reference point #3 331-1 via network messaging, or the like. In one embodiment, when traffic in the form of ATM VP/VC values is detected between remote and central units 320-1 and 330-1 automatic PVC function 306-1 learns the VP/VC values of reference point #2 321-1 and receives or learns the VP/VC values of reference point #3 331-1 by reviewing and learning the ATM VP/VC. Once both sets of VP/VC values are obtained the automatic PVC function 306-1 creates a translation connection for transmission of traffic between remote unit 320-1 and central unit 330-1. The automatic PVC function 306-1 continues to monitor the traffic passed between remote unit 320-1 and central unit 330-1 for changes in associated ATM VP/VC values. In one embodiment, when the ATM VP/VC values for reference point #2 321-1 and/or reference point #3 331-1 change the automatic PVC function 306-1 recreates a translation connection for transmission between remote unit 320-1 and central unit 330-1.

In another embodiment, in addition to monitoring the traffic between reference point #2 321-1 and reference point #3 331-1 the automatic PVC function 306-1 counts the number of times (X) that the VP/VC values of remote unit 320-1 is changed and proceeds to an exception state when X equals a value set by the network provider, network manager or the like.

In another embodiment, in addition to monitoring the traffic between reference point #2 321-1 and reference point #3 331-1 the automatic PVC function 306-1 can be enabled by a "valid PVC data base". The entries in the "valid PVC data base" determine whether or not the learned VP/VC value is acceptable for the given network. The data base may have been provisioned by the network provider, network manager or the like.

In an alternate embodiment, a background timer task located within the automatic PVC function 306-1 that times out and disconnects the translation connection when no activity exists on reference point #2, 321-1 or reference point #3, 331-1. In one embodiment, no activity is defined as an idle state when no "framed payload structure" exists on either reference point #2, 321-1 or reference point #3, 331-1. In one embodiment, when the timer expires, the translation connection is disconnected. This background timer is optional and is intended to recover from exception events due to errors (or other events) that may result in the learning of the wrong "virtual circuit identifier."

Figure 4:
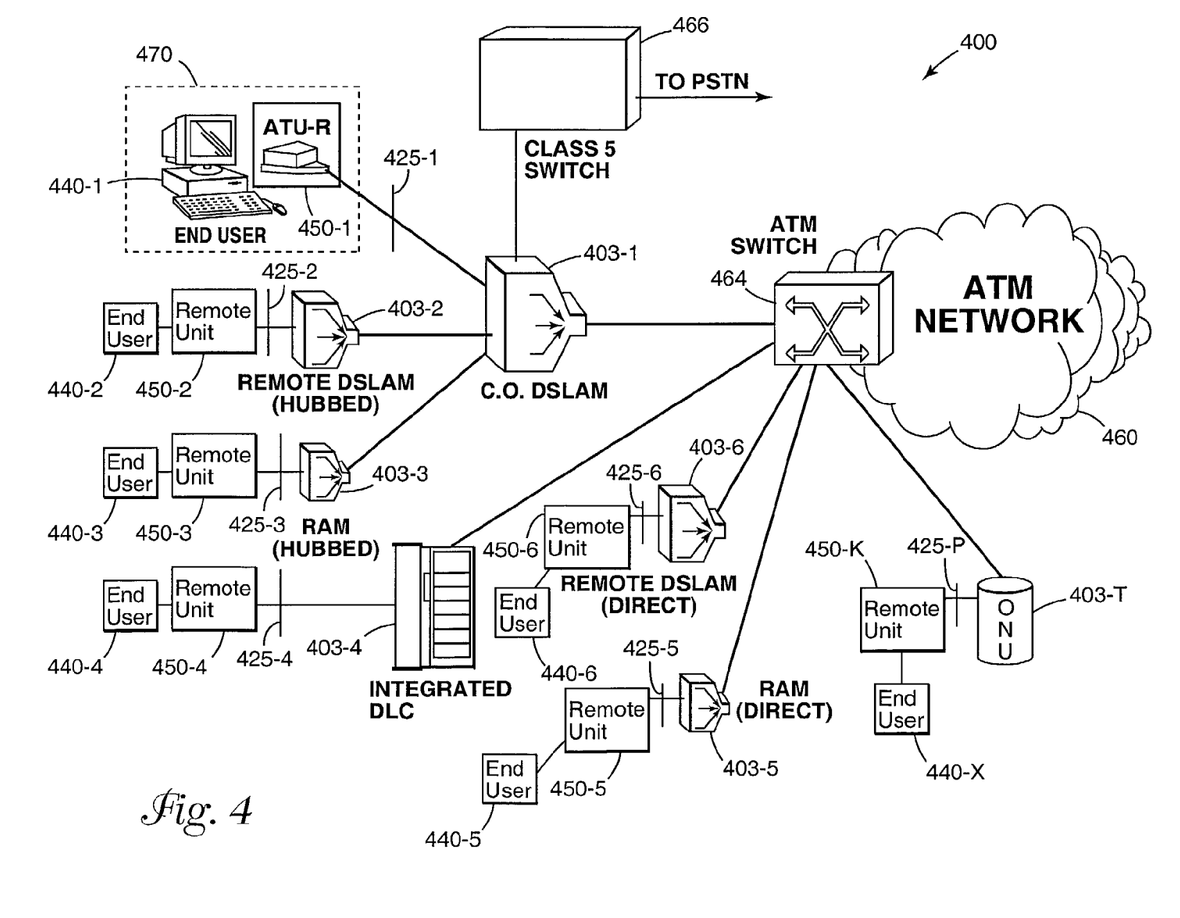
FIG. 4 is an illustration of another exemplary communication system employing an embodiment permanent virtual circuit connection activation according to the teachings of the present invention.

FIG. 4 is an illustration of one embodiment of a communication system shown generally at 400. Communication system 400 is a conglomeration of network elements and virtual connections employing automatic PVC connection activation according to the teachings of the present invention.

Communication system 400 includes a plurality of end-user devices 440-1 to 440-X. Each end-user device 440-1 to 440-X is selectively coupled to a remote unit 450-1 to 450-K and each remote unit is selectively coupled to a network element 403-1 to 403-T, respectively. Each remote unit to network element connection is enabled by automatic PVC connection activation as described with respect to FIGS. 1–3. As a result end-to-end communication between each end user device 440-1 to 440-X and a destination is achieved. The destination includes ATM network 460, any other associated networks, network elements, network switches or the like that are directly or indirectly connected to the source end-user device 440-x via the configured PVC.

Although only one remote unit 450-1 to 450-K is shown subtended from each network element 403-1 to 403-T, respectively, each network element 403-1 to 403-T is capable of supporting a plurality of remote units, network elements or the like.

In one embodiment, end user device 440-1 is selectively coupled to remote unit 450-1 and together they comprise customer premises equipment 470. Each network element 403-1 to 403-T includes a central unit or other device that provides a translation connection for each virtual connection between a remote unit 450-X and its associated network element 403-X. As illustrated in, FIG. 4 the network elements 403-1 to 403-T may comprise one of a central office digital subscriber line access multiplexer (C.O. DSLAM) such as 403-1, a remote DSLAM subtended from C.O. DSLAM 403-1 such as 403-2, a remote access multiplexer (RAM) subtended from C.O. DSLAM 403-1 such as 403-3, an integrated digital loop carrier (DLC) such as 403-4, a remote DSLAM subtended from ATM switch 464 such as 403-6, a remote RAM subtended from ATM switch 464 such as 403-5, an optical network unit (ONU) such as 403-T or the like.

End user devices 440-1 to 404-7 are each selectively coupled to remote unit 450-1 to 450-K, respectively. In one embodiment, remote unit 450-1 to 450-K is an ATU-R. Remote unit 450-1 to 450-K is selectively coupled to one of a number of network elements 403-1 to 403-T via a user network interface 425-1 to 425-P. In this embodiment, automatic PVC connection activation provides a translation connection between remote unit 450-1 to 450-K and it's associated network element 403-1 to 403-T.

C.O. DSLAM 403-1 is selectively coupled to ATM switch 464. ATM switch 464 is coupled to ATM network 460 and provides cross connection between ATM network 464 and network elements 403-1, and 403-4 to 403-T.

Although communication 400 is illustrated with a variety of network elements employing various transmission modes, it is understood that a communication system employing automatic PVC connection activation may include any combination of network elements, network nodes, switches, carrier systems or the like utilizing various transmission modes.

CONCLUSION

A method of automatic permanent virtual circuit connection activation has been described. The method includes detecting initiation of communication between a first and a second network element at a first reference point. The method further includes receiving at least one virtual circuit identifier of the first network element and learning at least one virtual circuit identifier of the second network element. In addition the method includes creating a translation connection between the first and second network elements.

Another method of automatic permanent virtual circuit connection activation has been described. The method detects initiation of communication between a first and a second network element at a first reference point. The method learns at least one virtual circuit identifier of the first network element and learns at least one virtual circuit identifier of the second network element. Further the method creates a translation connection between the first and second network elements.

A communication network has been described. The communication network includes an access network, a central unit selectively coupled to the access network and a customer premises equipment selectively coupled to the central unit. In addition, the communication network includes an automatic permanent virtual circuit (PVC) connection activation function embedded within the central unit. The automatic PVC is enabled when the customer premises equipment is initialized and is adapted to create a translation connection between the customer premises equipment and the central unit.

Although specific embodiments have been illustrated and described herein, it will be appreciated by those of ordinary skill in the art that any arrangement, which is calculated to achieve the same purpose, may be substituted for the specific embodiments shown. For example, although this invention is described with respect to configuring PVCs based on VP/VC values for the associated devices any type of virtual circuit identifiers may be used. This application is intended to cover any adaptations or variations of the present invention. Therefore, it is intended that this invention be limited only by the claims and the equivalents thereof.

What is claimed is:

1. A method of automatic permanent virtual circuit connection activation, the method comprising:
   detecting initiation of communication between a first and a second network element at a first reference point;
   receiving at least one virtual circuit identifier of the first network element;
   learning at least one virtual circuit identifier of the second network element;
   creating a translation connection between the first and second network elements;
   monitoring a permanent virtual circuit created by the translation connection;
   when the at least one virtual circuit identifier of the second network element changes, creating a new translation connection using the changed virtual circuit identifier of the second network element; and
   when the number of changes of virtual circuit identifiers of the second network element have reached a predetermined number of changes terminating the translation connection.

2. The method of claim 1, further comprising validating the at least one virtual circuit identifier of the first network element as defined by a valid permanent virtual circuit database.

3. The method of claim 1, further comprising validating the at least one virtual circuit identifier of the second network element as defined by a valid permanent virtual circuit database.

4. The method of claim 1, wherein learning at least one virtual circuit identifier of the second network element, comprises:

monitoring traffic between the first and second network elements for any type of virtual circuit identifier transmitted from the second network element; and identifying the at least one virtual circuit identifier of the second network element in the traffic.

5. The method of claim 1, further comprising validating the changed virtual circuit identifier of the second network element as defined by a valid permanent virtual circuit database.

6. The method of claim 1, wherein receiving at least one virtual circuit identifier of the first network element comprises receiving a message from an associated network containing the at least one virtual circuit identifier of the first network element.

7. A method of automatic permanent virtual circuit connection activation, the method comprising:
  detecting initiation of communication between a first and a second network element at a first reference point:
  receiving at least one virtual circuit identifier of the first network element;
  learning at least one virtual circuit identifier of the second network element;
  creating a translation connection between the first and second network elements;
  monitoring the first reference point and a second reference point, that is located on the network side of the first network element, for activity;
  when no activity is detected at the first or second reference points starting a timer; and
  when the timer has reached a predetermined amount of time terminating the translation connection.

8. A method of automatic permanent virtual circuit connection activation, the method comprising:
  detecting initiation of communication between a first and a second network element at a first reference point;
  receiving at least one virtual circuit identifier of the first network element;
  learning at least one virtual circuit identifier of the second network element;
  creating a translation connection between the first and second network elements;
  wherein learning at least one virtual circuit identifier of the second network element comprises receiving traffic from the second network element containing the at least one virtual circuit identifier of the second network element and storing the identifier.

9. A method of automatic permanent virtual circuit connection activation, the method comprising:
  detecting initiation of communication between a first and a second network element at a first reference point;
  learning at least one virtual circuit identifier of the first network element;
  learning at least one virtual circuit identifier of the second network element;
  creating a translation connection between the first and second network elements,
  monitoring permanent virtual circuit created by the translation connection; and
  when the at least one virtual circuit identifier of the second network element changes, creating a new translation connection using the changed virtual circuit identifier of the second network element; and
  when the number of changes of virtual circuit identifiers of the second network element have reached a predetermined number of changes terminating the translation connection.

10. The method of claim 9, further comprising validating the at least one virtual circuit identifier of the first network element as defined by a valid permanent virtual circuit database.

11. The method of claim 9, further comprising validating the at least one virtual circuit identifier of the second network element as defined by a valid permanent virtual circuit database.

12. The method of claim 9, further comprising validating the changed virtual circuit identifier of the second network element as defined by a valid permanent virtual circuit database.

13. The method of claim 9, wherein learning at least one virtual circuit identifier of the first network element comprises receiving traffic from the first network element containing the at least one virtual circuit identifier of the first network and storing the at least one virtual circuit identifier of the first network element.

14. A method of automatic permanent virtual circuit connection activation, the method comprising:
  detecting initiation of communication between a first and a second network element at a first reference point;
  learning at least one virtual circuit identifier of the first network element;
  learning at least one virtual circuit identifier of the second network element;
  creating a translation connection between the first and second network elements;
  monitoring the first reference point and a second reference point, that is located on the network side of the first network element, for activity;
  when no activity is detected at the first or second reference points starting a timer; and
  when the timer has reached a predetermined amount of time terminating the translation connection.

15. A method of automatic permanent virtual circuit connection activation, the method comprising:
  detecting initiation of communication between a first and a second network element at a first reference point;
  learning at least one virtual circuit identifier of the first network element;
  learning at least one virtual circuit identifier of the second network element;
  creating translation connection between the first and second network elements; and
  wherein learning at least one virtual circuit identifier of the second network element comprises receiving traffic from the second network element containing the at least one virtual circuit identifier of the second network element and storing the at least one virtual circuit identifier of the second network element.

16. A method of automatic permanent virtual circuit connection activation, the method comprising:
  detecting initiation of communication between customer premises equipment and a network element at a first reference point;
  receiving at least one virtual circuit identifier of the network element;
  learning at least one virtual circuit identifier of the customer premises equipment;
  creating a translation connection between the customer premises equipment and the network element;
  monitoring a permanent virtual circuit created by the translation connection;
  when the at least one virtual circuit identifier for the customer premises equipment changes, recreating the translation connection using the changed virtual circuit identifier for the customer premises equipment; and when the number of changes of virtual circuit identifiers of the customer premises equipment have reached a predetermined number of changes terminating the translation connection.

17. The method of claim 16, further comprising validating the at least one virtual circuit identifier of the network element as defined by a valid permanent virtual circuit database.

18. The method of claim 16, further comprising validating the at least one virtual circuit identifier of the customer premises equipment as defined by a valid permanent virtual circuit database.

19. The method of claim 16, further comprising validating the changed virtual circuit identifier for the customer premises equipment as defined by a valid permanent virtual circuit database.

20. The method of claim 16, wherein receiving at least one virtual circuit identifier of the network element comprises receiving a message from an associated network containing the at least one virtual circuit identifier of the network element.

21. The method of claim 16, wherein learning at least one virtual circuit identifier of the customer premises equipment comprises receiving traffic from the customer premises equipment containing the at least one virtual circuit identifier of the customer premises equipment and storing the at least one virtual circuit identifier of the customer premises equipment.

22. A method of automatic permanent virtual circuit connection activation, the method comprising:
  detecting initiation of communication between customer premises equipment and a network element at a first reference point;
  receiving at least one virtual circuit identifier of the network element
  learning at least one virtual circuit identifier of the customer premises equipment;
  creating a translation connection between the customer premises equipment and the network element;
  monitoring the first reference point and a second reference point, that is located on the network side of the network element, for activity;
  when no activity is detected at the first or second reference points starting a timer; and
  when the timer has reached a predetermined amount of time terminating the translation connection.

23. A method of automatically configuring a permanent virtual circuit in an ATM network, the method comprising:
  detecting communication initiation of an ATU-R;
  receiving at least one virtual circuit identifier of an ATU-C;
  learning at least one virtual circuit identifier of the ATU-R;
  creating a translation connection between the ATU-R and the ATU-C;
  monitoring permanent virtual circuit created by the translation connection; and
  when the at least one virtual circuit identifier for the ATU-R changes, recreating the translation connection using the changed virtual circuit identifier for the ATU-R; and
  when the number of chances of at least one virtual circuit identifier of the ATU-R reaches a predetermined number of changes terminating the translation connection.

24. The method of claim 23, further comprising validating the at least one virtual circuit identifier of the ATU-R as defined by a valid permanent virtual circuit database.

25. The method of claim 23, wherein detecting communication initiation of an ATU-R comprises detecting communication initiation of an ATU-R at a first reference point.

26. The method of claim 23, further comprising validating the changed at least one virtual circuit identifier as defined by a valid permanent virtual circuit database.

27. The method of claim 23, wherein receiving at least one virtual circuit identifier of the ATU-C comprises receiving a message from an associated network containing die at least one virtual circuit identifier of the ATU-C.

28. The method of claim 23, wherein learning at least one virtual circuit identifier of the ATU-R comprises receiving traffic from the ATU-R containing the at least one virtual circuit identifier of the ATU-R and storing the at least one virtual circuit identifier of the ATU-R.

29. A method of automatically configuring a permanent virtual circuit in an ATM network, the method comprising:
  detecting communication initiation of an ATU-R;
  receiving at least one virtual circuit identifier of an ATU-C;
  learning at least one virtual circuit identifier of the ATU-R;
  creating a translation connection between the ATU-R and the ATU-C
  wherein detecting communication initiation of an ATU-R comprises detecting communication initiation of an ATU-R at a first reference point;
  monitoring the first reference point and a second reference point, that is located on the network side of the ATU-C, for activity;
  when no activity is detected at the first or second reference points starting a timer; and
  when the timer has reached a predetermined amount of time terminating the translation connection.

30. A communication network, comprising:
  an access network;
  a central unit selectively coupled to the access network;
  customer premises equipment selectively coupled to the central unit; and
  an automatic permanent virtual circuit (PVC) connection activation function embedded within the central unit, wherein the automatic PVC is enabled when the customer premises equipment is initialized and is adapted to create a translation connection between the customer premises equipment and the central unit;
  wherein the central unit learns at least one virtual circuit identifier of the customer premises equipment by receiving traffic from the customer premises equipment containing the at least one virtual circuit identifier of the customer premises equipment and stores the at least one virtual circuit identifier of the customer premises equipment.

31. The network of claim 30, further comprising a network interface between the customer premises equipment and the central unit.

32. The network of claim 30, wherein the customer premises equipment comprises an end user device selectively coupled to a remote unit.

33. A method of automatic permanent virtual circuit connection activation, the method comprising:
  detecting initiation of communication at a user network interface between a first and a second network element;

receiving at least one virtual circuit identifier of the first network element;
learning at least one virtual circuit identifier of the second network element;
creating a translation connection between the first and second network elements; and
when the number of changes of virtual circuit identifiers of the second network element have reached a predetermined number of changes terminating the translation connection.

34. The method of claim 33, wherein learning at least one virtual circuit identifier of the second network element, comprises:
monitoring traffic between the first and second network elements for any type of virtual circuit identifier transmitted from the second network element; and
identifying the at least one virtual circuit identifier of the second network element in the traffic.

35. The method of claim 33, further comprising:
monitoring a permanent virtual circuit created by the translation connection;
when the at least one virtual circuit identifier of the second network element changes, creating a new translation connection using the virtual circuit identifier of the second network element.

36. The method of claim 33, wherein receiving at least one virtual circuit identifier of the first network element comprises receiving a message from an associated network containing the at least one virtual circuit identifier of the first network element.

37. A method of automatic permanent virtual circuit connection activation, comprising:
detecting initiation of communication at a user network interface between a first and a second network element;
receiving at least one virtual circuit identifier of the first network element;
learning at least one virtual circuit identifier of the second network element;
creating a translation connection between the first and second network elements;
monitoring the user network interface and a network node interface, that is located on the network side of the first network element, for activity;
when no activity is detected at the user network interface or the network node interface starting a timer; and
when the timer has reached a predetermined amount of time terminating the translation connection.

38. A method of automatic permanent virtual circuit connection activation, the method comprising:
detecting initiation of communication at a user network interface between a first and a second network element;
receiving at least one virtual circuit identifier of the first network element;
learning at least one virtual circuit identifier of the second network element; and
creating a translation connection between the first and second network elements;
wherein learning at least one virtual circuit identifier of the second network element comprises receiving traffic from the second network element containing the at least one virtual circuit identifier of the second network element and storing the identifier.

39. A method of automatic permanent virtual circuit connection activation, the method comprising:
detecting initiation of communication at a user network interface between a first and a second network element;
learning at least one virtual circuit identifier of the first network element;
learning at least one virtual circuit identifier of the second network element;
creating a translation connection between the first and second network elements;
monitoring a permanent virtual circuit created by the translation connection; and
when the at least one virtual circuit identifier of the second network element changes, creating a new translation connection using the changed virtual circuit identifier of the second network element; and
when the number of changes of virtual circuit identifiers of the second network element have reached a predetermined number of changes terminating the translation connection.

40. The method of claim 39, wherein learning at least one virtual circuit identifier of the first network element comprises receiving traffic from the first network element containing the at least one virtual circuit identifier of the first network and storing the at least one virtual circuit identifier of the first network element.

41. A method of automatic permanent virtual circuit connection activation, comprising:
detecting initiation of communication at a user network interface between a first and a second network element;
learning at least one virtual circuit identifier of the first network element;
learning at least one virtual circuit identifier of the second network element;
creating a translation connection between the first and second network elements;
monitoring the user network interface and a network node interface, that is located on the network side of the first network element, for activity;
when no activity is detected at the user network interface or the network node interface starting a timer; and
when the timer has reached a predetermined amount of time terminating the translation connection.

42. A method of automatic permanent virtual circuit connection activation, comprising:
detecting initiation of communication at a user network interface between a first and a second network element;
learning at least one virtual circuit identifier of the first network element;
learning at least one virtual circuit identifier of the second network element; and
creating a translation connection between the first and second network elements;
wherein learning at least one virtual circuit identifier of the second network element comprises receiving traffic from the second network element containing the at least one virtual circuit identifier of the second network element and storing the at least one virtual circuit identifier of the second network element.

* * * * *

UNITED STATES PATENT AND TRADEMARK OFFICE
CERTIFICATE OF CORRECTION

PATENT NO. : 6,990,110 B2
APPLICATION NO. : 09/833780
DATED : January 24, 2006
INVENTOR(S) : Nattkemper et al.

It is certified that error appears in the above-identified patent and that said Letters Patent is hereby corrected as shown below:

At Claim 23, Column 13, Line 65, replace the first occurrence of "chances" with --changes--

At Claim 27, Column 14, Line 12, replace the first occurrence of "die" with --the--

Signed and Sealed this

Second Day of December, 2008

JON W. DUDAS
*Director of the United States Patent and Trademark Office*